US010042656B2

United States Patent
Zimmermann et al.

(10) Patent No.: US 10,042,656 B2
(45) Date of Patent: Aug. 7, 2018

(54) SYSTEM AND METHOD FOR PROVIDING MIGRATEABLE VIRTUAL SERIAL PORT SERVICES

(75) Inventors: Arnaldo Zimmermann, Dublin, CA (US); Edson Seabra, Newark, CA (US)

(73) Assignee: Avocent Corporation, Huntsville, AL (US)

( * ) Notice: Subject to any disclaimer, the term of this patent is extended or adjusted under 35 U.S.C. 154(b) by 0 days.

(21) Appl. No.: 13/563,422

(22) Filed: Jul. 31, 2012

(65) Prior Publication Data
US 2013/0198744 A1 Aug. 1, 2013

Related U.S. Application Data

(60) Provisional application No. 61/513,973, filed on Aug. 1, 2011.

(51) Int. Cl.
*G06F 9/455* (2018.01)

(52) U.S. Cl.
CPC .......... *G06F 9/455* (2013.01); *G06F 9/45558* (2013.01); *G06F 2009/4557* (2013.01)

(58) Field of Classification Search
None
See application file for complete search history.

(56) References Cited

U.S. PATENT DOCUMENTS

| 6,633,905 | B1  | 10/2003 | Anderson et al. |
| 6,681,250 | B1  | 1/2004  | Thomas et al.   |
| 7,478,152 | B2  | 1/2009  | Holt            |
| 7,788,665 | B2* | 8/2010  | Oshins ............................. 718/1 |
| 7,853,682 | B2  | 12/2010 | Holt            |
| 8,176,155 | B2  | 5/2012  | Yang            |
| 8,224,957 | B2  | 7/2012  | Hansson         |
| 8,701,108 | B2  | 4/2014  | Sekiguchi et al.|
| 8,924,564 | B2  | 12/2014 | Lublin et al.   |
| 8,949,431 | B2  | 2/2015  | Bercovici et al.|
| 2002/0062454 | A1* | 5/2002 | Fung ..................... G06F 1/3203 713/300 |
| 2009/0241113 | A1* | 9/2009 | Seguin ................. G06F 1/3209 718/1 |
| 2010/0142544 | A1* | 6/2010 | Chapel ................. H01R 25/006 370/401 |
| 2010/0257269 | A1* | 10/2010 | Clark ........................... 709/226 |

(Continued)

OTHER PUBLICATIONS

Dan Pelleg "Vigilant: out-of-band detection of failures in virtual machines", Jan. 2008, ACM SIGOPS Operating Systems Review.*

(Continued)

*Primary Examiner* — Wynuel Aquino
(74) *Attorney, Agent, or Firm* — Davidson Berquist Jackson & Gowdey, LLP

(57) ABSTRACT

A virtualization environment provides a virtual console server that communicates with other virtual servers/machines utilizing virtual hardware connections such that the virtual remote console server can monitor and/or control the virtual servers/machines in the environment as if the virtual remote console server and the other virtual servers/machines were connected, even if the virtual console server and/or the other virtual servers are moved between processors in the virtualization environment.

8 Claims, 3 Drawing Sheets

(56) References Cited

U.S. PATENT DOCUMENTS

| | | | |
|---|---|---|---|
| 2012/0030670 A1* | 2/2012 | Vijay | G06F 9/45558 |
| | | | 718/1 |
| 2012/0079566 A1* | 3/2012 | Barranco | H04L 63/18 |
| | | | 726/4 |
| 2012/0102156 A1 | 4/2012 | Kang et al. | |
| 2012/0151209 A1* | 6/2012 | Visnyak | H04L 9/3234 |
| | | | 713/166 |
| 2012/0151475 A1* | 6/2012 | Bealkowski | G06F 9/455 |
| | | | 718/1 |
| 2012/0297236 A1* | 11/2012 | Ziskind | G06F 11/1484 |
| | | | 714/3 |
| 2013/0305242 A1 | 11/2013 | Wang et al. | |
| 2013/0326173 A1 | 12/2013 | Tsirkin | |
| 2014/0130044 A1 | 5/2014 | Zhang et al. | |
| 2014/0215172 A1 | 7/2014 | Tsirkin | |
| 2015/0052254 A1 | 2/2015 | Zhao | |
| 2015/0052282 A1 | 2/2015 | Dong | |

OTHER PUBLICATIONS

Kang, "PeerWatch: a Fault Detection and Diagnosis Tool for Virtualized Consolidation Systems", 2010 ACM 978-1-4503-0074-Feb. 10, 2006.*

"A new Remote USB Architecture for Live Migration of Virtual Machines in SOD (System-on-Demand)"; Kang, Do; International Conference on Control, Automation and Systems (ICCAAS 2010)—Oct. 2010.

"A PMIPv6 approach to maintain network connectivity during VM live migration over the internet"; Kassahun S; Cloud Networking, 2014 IEEE 3rd International Conference (Oct. 2014).

Realizing Mobile Computing Personae: A Dissertation, M. Casey (1995).

Digi CM User Guide, 2003.

DigitalV6 Kaveman 16 User Manual, 2003.

DigitalV6 Kaveman 8 User Manual, alleged by third-party to be published/publicly used and known before Jun. 29, 2004.

DSR 800 1010 2010 4010 Installation User Guide, 2003.

DSR 800 1161 2161 4160 Installation User Guide, 2003.

DSR1021 Installation User Guide, 2004.

DSView Installation User Guide, 2003.

OutPost Sentinel ENS Product Brochure, 2003.

OutPost Sentinel LLC Whitepaper, 2002.

Raritan CommandCenter Manual, 2003.

The Definitive KVM Buyer's Guide, 2003.

Xceedium NET-KVM System, 2004.

Xceedium UAG System, 2004.

* cited by examiner

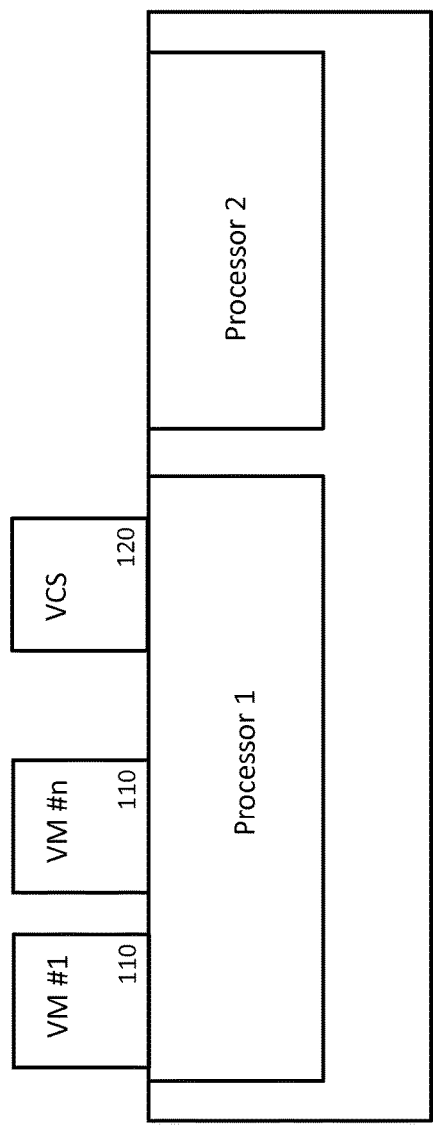
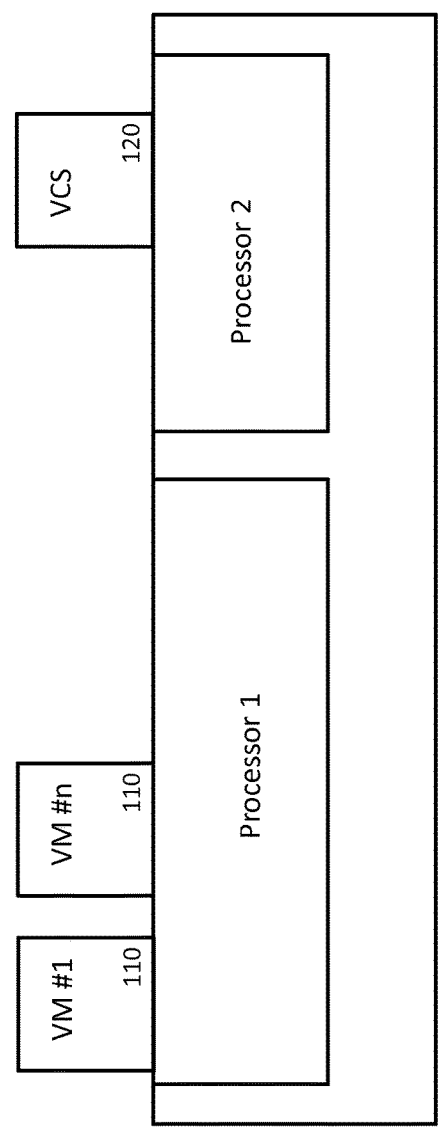

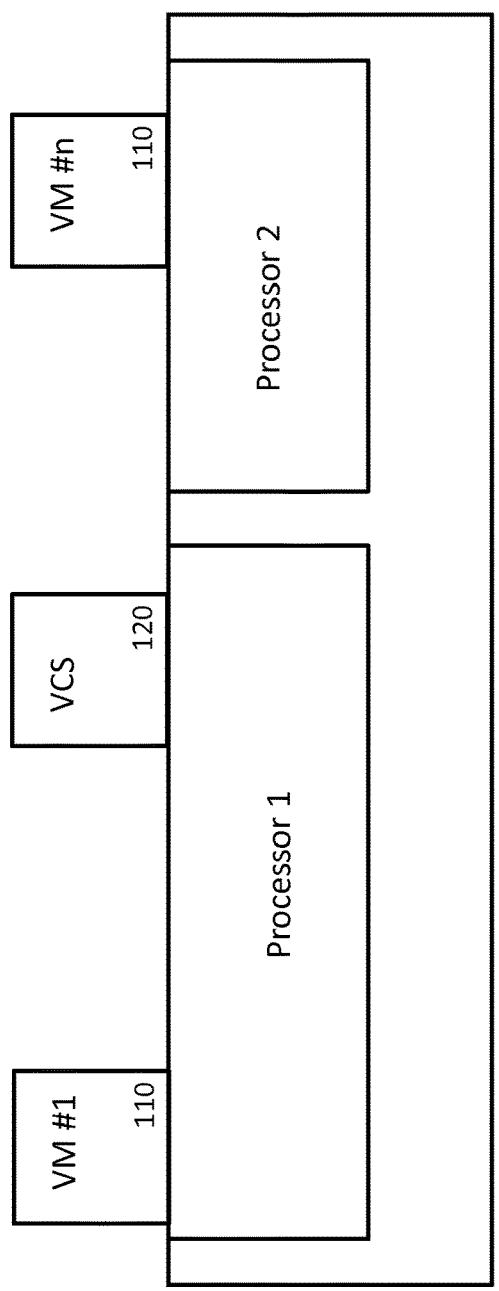

SYSTEM AND METHOD FOR PROVIDING MIGRATEABLE VIRTUAL SERIAL PORT SERVICES

CROSS REFERENCE TO RELATED APPLICATIONS

This application claims benefit to U.S. Provisional Application No. 61/513,973, filed Aug. 1, 2011, which is incorporated by reference herein.

FIELD OF INVENTION

The present invention is directed to a system and method for providing support for virtual serial capabilities for virtual remote access and/or control devices, and in one embodiment, to a system and method for providing support for virtual serial capabilities for virtual remote access and/or control devices that can migrate in a virtualization environment.

DISCUSSION OF THE BACKGROUND

The ACS 6000 is a known hardware-based console system that provides a high-speed processor platform with dual gigabit-Ethernet ports for redundancy, optional built-in modem and two 16- and 32-bit PC card options. Other benefits include an internal temperature sensor for device-level monitoring and configurable pin-outs for serial ports.

BRIEF DESCRIPTION OF THE DRAWINGS

The following description, given with respect to the attached drawings, may be better understood with reference to the non-limiting examples of the drawings, wherein:

FIGS. 2A-2C are block diagrams of a virtual console server and virtual servers migrating between processors as part of a virtual environment.

DISCUSSION OF THE PREFERRED EMBODIMENTS

Figure 1:
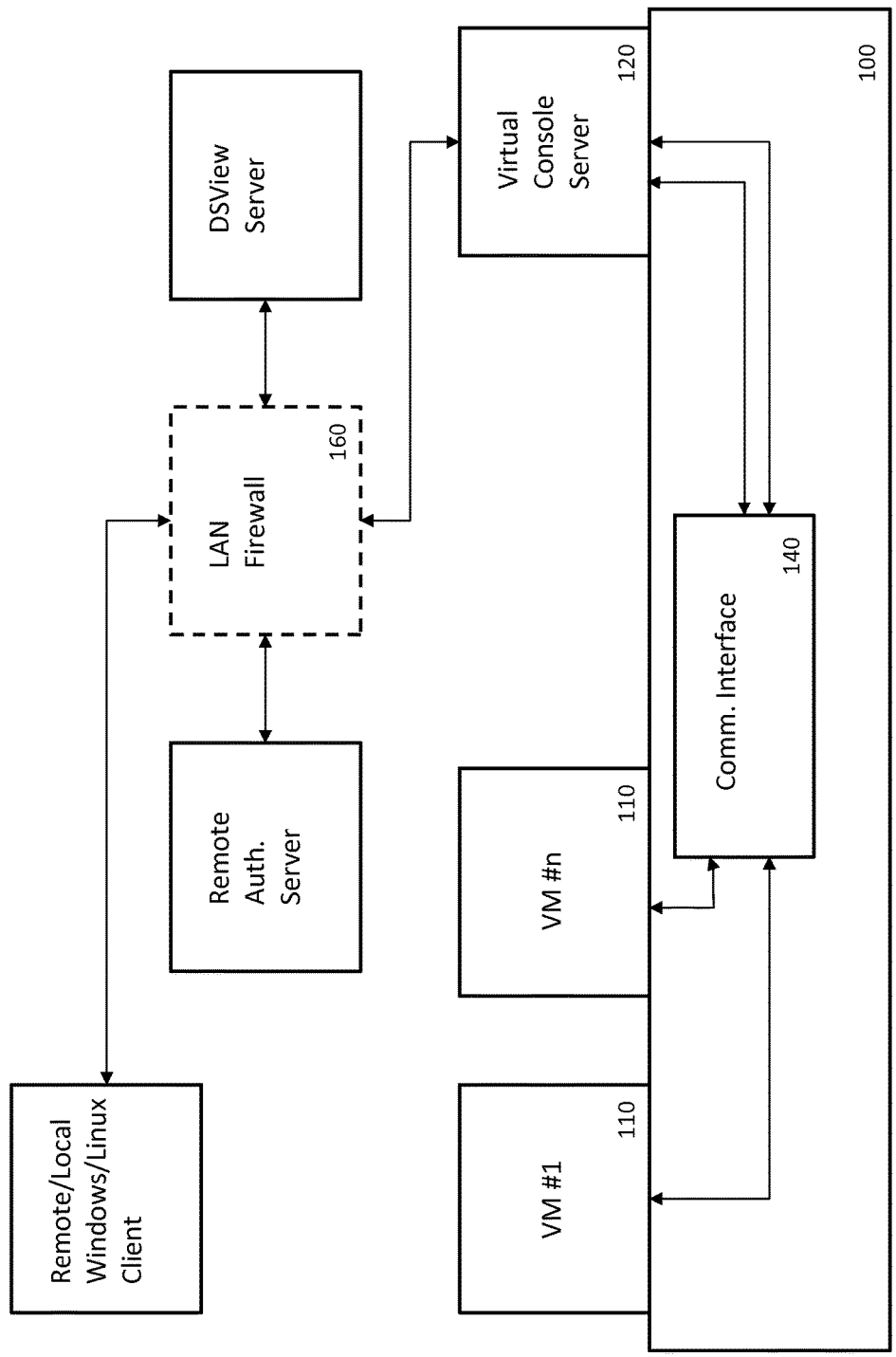
FIG. 1 is block diagram of a virtualization environment in which a virtual console server communicates with other virtual servers/machines utilizing virtual hardware connections such that the virtual remote console server can monitor and/or control the virtual servers/machines in the environment as if the virtual remote console server and the other virtual servers/machines were connected.

Turning to FIG. 1, FIG. 1 is a block diagram of a virtualization environment 100 in which a virtual remote console server 120 communicates with other virtual servers 110 utilizing virtual hardware connections such that the virtual remote console server 120 can monitor and/or control the virtual servers 110 running on the virtualization environment 100 as if the virtual remote console server 120 and the other virtual servers 110 were connected (e.g., by serial ports connected over a serial cable or a modem pair). By utilizing a communications interface 140 on the virtual console 120, the communications between the virtual console server 120 and the virtual servers 110 can continue even if the virtual console server is migrated between processors implementing the virtualization environment 100.

In one embodiment, the virtualization environment is a VMWare ESX host system; however, other virtual environments are possible such as PARALLELS virtual environment and VIRTUALBOX virtual environment when modified as described herein. In such an environment, the virtual console server provides secure remote access and concentration of serial console ports of guest operating systems running on the virtual machines in the virtualization environment. Such remote access may be particularly useful when the guest operating system is not reachable via normal in-band access due to an incorrect network configuration, an inactive Ethernet interface or any other guest operating system problem. As long as the virtual communications network is reachable and the virtual console server 120 (e.g., a virtual ACS 6000 ("a ACS v6000")) can access the virtual communications network, the virtual console server can (1) provide out-of-band access to the guest operating systems' serial console ports in order to fix problems and (2) provide access to the serial ports of the various virtual machines.

As shown in FIGS. 2A-2C, the virtual console server and the other virtual servers need not be run on the same processor in the virtual environment. In fact, the virtual console and/or the other virtual servers may be migrated between processors during operation (e.g., by using VMWARE VMOTION movement technology).

By allowing a virtual console server to access a virtual server in the virtualization environment, the virtual machines' network communications can be reconfigured without the virtual console getting disconnected from the session viewer (since they are communicating via serial communications rather than the network communication (e.g., (virtual) Ethernet connections)). The serial access provided by the virtual console server 120 also allows troubleshooting of problems that can happen during the boot process. For example, virtual servers running the MICROSOFT WINDOWS operating system can redirect debug information to the serial console. Similarly, virtual servers running the UNIX or LINUX operating systems can send boot messages to the serial console or even boot the virtual servers in single user mode. In this way, legacy systems that do not need to be run on their own physical servers can be run instead as operating systems running in virtual machines of the virtualization environment and the virtual console server can still manage and/or control those systems even though they run on virtual machines rather than separate physical hardware.

System administrators can access the virtual console server 120 using any number of protocols (e.g., telnet, secure shell (SSH) or other web-based protocols, such as HTTP or HTTPS). System administrators can remotely manage the virtual servers by writing scripts to automate configuration and management tasks through the serial console. Additionally, users can remotely connect to the virtual console server 120 using a remote serial console viewer (such as a client running a WINDOWS or LINUX operating system (on a physical platform that is not part of the virtualization environment) or a DSView Server (that is not part of the virtualization environment), with communications optionally going through a LAN firewall 160 (FIG. 1). The user may also be required to authenticate itself to a remote authentication server (e.g., outside of the virtualization environment). Once connected, users (e.g., system administrators) may be able to perform other administrative tasks (e.g., power on, power off, power cycle, and suspend) by requesting the service using a serial console (e.g., by using a hot key or a menu item). Administrative tasks such as power on, power off, power cycle, and suspend can be provided by the virtual console server 120 making an API (Application Programming Interface) call to the virtual environment (e.g., the VMWARE virtual environment) to act on the corresponding virtual machine accordingly.

In one embodiment, a virtual console server can be built from at least one of (1) a binary image such as is booted from a physical version of the console server when the console server is built in hardware and (2) code that has been built to create the software run by a physical console server but that has been adapted to be run in a virtualization environment. In such environments, virtualization extensions may enable seamless migration of virtual servers or the virtual console server (e.g., by using VMWARE VMOTION movement technology) by having the virtual servers and the virtual console server connect to a communications interface 140 within the virtualization environment that directs communications to the appropriate virtual serial devices. For example, the virtual communication network inside the virtualization network can route packets to communications end points (e.g., sockets used for telnet sessions) which appear to the servers and console server to be hardware but which are actually software communications endpoints. Access to the virtual servers may be made by IP address or name (e.g., using a DNS style or NetBIOS style lookup process). For example, the connection parameters could be specified as: telnet://<ACS v6000>:<vSPC port> where <ACS v6000> is the ACS v6000 IP address within the virtualization environment and <vSPC port> is the virtual console server application's socket port associated to the guest host serial port.

The virtual console server 120 may include preset and/or customized security profiles that control how users can interact with virtual servers through the virtual console server 120 and may utilize remote authentication services. Security may be enhanced with strong password enforcement and password expiration rules. Authorization and/or rights may also be provided on a user-basis and/or a group basis.

The virtual console server 120 may provide simultaneous access to the same serial console and may allow multiple simultaneous sessions for virtual servers with the ability to toggle between active concurrent sessions. Communications with the virtual console server also can be performed using IPSec with NAT traversal.

The virtual console server 120 may also provide data logging of the variously connected virtual servers to which it is connected and processing of the serial data that is received from the virtual servers. Searches within the received serial data can be performed and notifications sent from the virtual console server to a remote user to indicate that a specified condition has occurred based on the search results. For example, a debugging message output on a virtual serial port of a virtual server may be processed to indicate that unrecoverable fault has occurred on the virtual server and the virtual server needs rebooting or other maintenance.

The virtual console server 120 may also provide event notification using any event notification mechanism (e.g., email, SMS, SNMP traps, DSView 3 software and Syslog).

The virtual console server 120 may also provide any of the other features that are present in the ACS 6000 as described in the ACS v6000 Installation/Administration/User Guide, and the ACS v6000 Command Reference Guide, both of which are attached hereto and constitute part of this application.

In light of the virtual nature of the servers, the virtualization environment may further provide the virtual console server with the ability to determine the name of the virtual server that is connected to the virtual console server.

In general, the configuration of the virtual console server and its interactions/connections with the virtual servers can be performed using a web interface (e.g., an HTML interface or another interface that is served to a remote user's computer via a web protocol such as HTTP or HTTPS). The virtual console server then stores the configuration information in a non-volatile memory (e.g., a virtual disk) accessible to it so that the configuration can be reloaded after a restart of the virtualization environment. The virtual console server, therefore, may include one or more virtual server processes that handle the interactions with remote computers. For example, the virtual console server may include a web-server application that can be communicated with using data exchange protocols such as HTTP, HTTPS, FTP and Web-DAV. The virtual console server further may receive data in any number of formats, such as text, MIME and XML.

In one embodiment, the virtual console server can be instructed to capture the state of any virtual server to which it is attached. The state(s) can then be rolled back to a previously stored state at a later point in time (e.g., using a command from a user connected by remote access system or software).

As would be appreciated by those of ordinary skill in the art, the virtualization environment can be implemented using at least one computer processor, computer memory and computer code configured to provide virtualization services including the creation and management of virtual servers that can communication with a virtual console server. In at least one embodiment, the virtualization environment is configured to support a large number of virtual serial interfaces (e.g., 20+ virtual serial interfaces) that the virtual console server can utilize to connect to a correspondingly large number of virtual servers.

While certain configurations of structures have been illustrated for the purposes of presenting the basic structures of the present invention, one of ordinary skill in the art will appreciate that other variations are possible which would still fall within the scope of the appended claims.

The invention claimed is:

1. A virtualization environment comprising:
   first and second processors;
   computer memory accessible by at least one processor of the first and second processors; and
   computer code contained within the computer memory to control the at least one processor to perform the steps of:
   generating at least one virtual server,
   generating a virtual console server that runs as a virtual machine separate from the at least one virtual server and provides virtual serial console access to the at least one virtual server;
   specifying a virtual serial connection between the at least one virtual server and the virtual console server such that virtual serial communication can continue between the at least one virtual server and the virtual console server if at least one of the at least one virtual server and the virtual console server is moved from the first processor to the second processor;
   communicating between the at least one virtual server and the virtual console server using the virtual serial connection as an out-of-band communication channel when virtual in-band communication between the at least one virtual server and the virtual console server fails using virtual Ethernet communications;
   receiving first commands at the virtual console server to configure the virtual console server from a first computer remote from the virtualization environment;

receiving second commands at the virtual console server from the first computer, wherein the second commands cause the at least one virtual server to be controlled by the virtual console server over the virtual serial connection; and receiving a debugging message from the at least one virtual server via the virtual serial connection indicating that the at least one virtual server has experienced an unrecoverable fault.

2. The virtualization environment as claimed in claim 1, wherein the virtual serial connection is specified as an IP address and port number.

3. The virtualization environment as claimed in claim 1, wherein the virtual serial connection is specified as computer name and port number.

4. The virtualization environment as claimed in claim 1, wherein the virtual console server further comprises computer code for providing access control to the at least one virtual server from a second computer remote from the virtualization environment.

5. The virtualization environment as claimed in claim 4, wherein the first and second computers are different computers.

6. The virtualization environment as claimed in claim 4, wherein the virtual console server communicates with the second computer remote from the virtualization environment using IPSec communications.

7. The virtualization environment as claimed in claim 1, wherein the virtual console server further comprises:

computer code for requesting using the virtual serial connection that the at least one virtual server be restarted.

8. The virtualization environment as claimed in claim 1, wherein the virtual console server further comprises:

computer code for requesting using the virtual serial connection that the at least one virtual server be powered off.

\* \* \* \* \*